June 4, 1968

A. H. FOLEY 3,387,208

IMPEDANCE COMPENSATED HIGH PRECISION ELECTRICAL
CAPACITANCE MEASURING BRIDGE

Filed March 16, 1964

VOLTAGE OF SUPPLY CIRCUIT 5

Inventor,
Albert H. Foley,
by Gilbert P. Tarleton
His Attorney.

Inventor,
Albert H. Foley,
by Gilbert P. Tarleton
His Attorney.

United States Patent Office
3,387,208
Patented June 4, 1968

3,387,208
IMPEDANCE COMPENSATED HIGH PRECISION
ELECTRICAL CAPACITANCE MEASURING
BRIDGE
Albert H. Foley, Pittsfield, Mass., assignor to General
Electric Company, a corporation of New York
Filed Mar. 16, 1964, Ser. No. 351,969
14 Claims. (Cl. 324—60)

ABSTRACT OF THE DISCLOSURE

A high precision electrical bridge for measurement of electrical capacitance is compensated for impedance of the yoke lead to the specimen capacitor. Compensation is provided by a novel circuit comprising a resistor and capacitor serially connected in shunt across the yoke lead and providing at their junction one output terminal of the bridge, the product of the shunt impedances being equal to the product of the specimen capacitance and a standard resistance in the serially connected arm of the bridge. The series resistance arm is protected against overvoltage and against leakage current errors by a plural-gap network and electrostatic shielding of bridge leads, with a low gain power amplifier energized across the series resistor and connected to control the shield and gap network potential.

---

Figure 1:
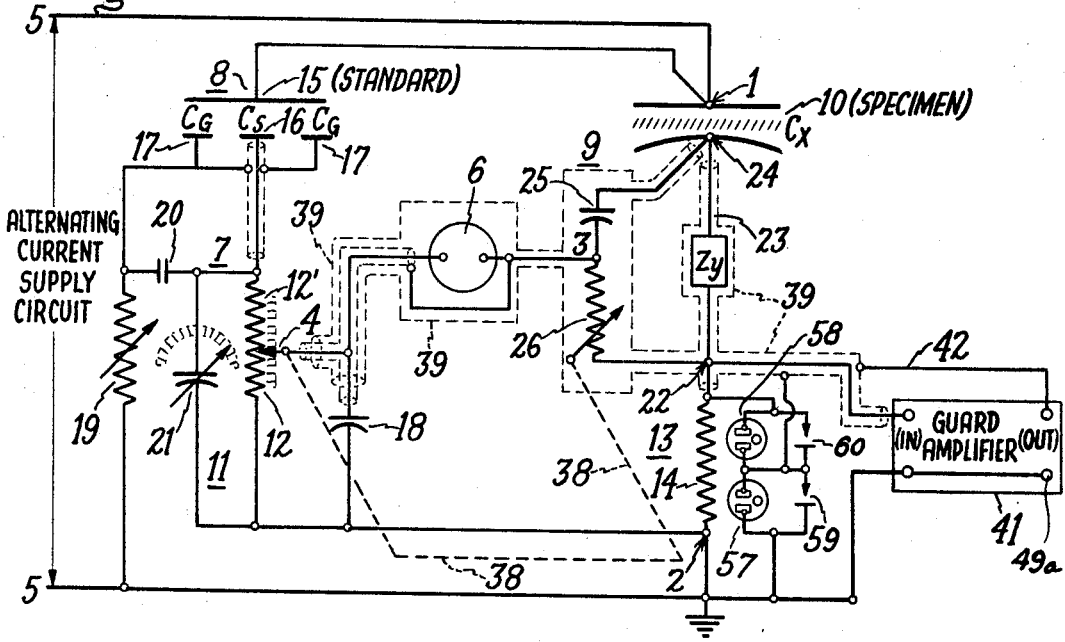

This invention relates to high precision electrical measurements and more particularly to improvements in alternating current electrical bridges for measuring high voltage low loss reactive devices, especially direct reading bridges.

In high precision electrical measurements all ordinary circuit elements have measurable resistance, inductance and capacitance. They are called resistors, inductors or capacitors depending upon whether it is their resistance, inductance or capacitance which is their predominant electrical characteristic under the particular circuit conditions for which they are designed to be used. In other words, from the standpoint of high precision electrical measurements almost no circuit elements are pure resistive or reactive elements.

An electrical bridge is a well-known device for measuring the characteristics of electric circuit elements. Its mechanical analogy is a balance beam weighing scale in which an unknown weight can be determined by comparing it with different known weights until the scale balances under which condition there is a definite ratio between the unknown weight and the counterbalancing known weight from which the unknown weight can be determined. In a conventional electrical bridge, the unknown impedance element is connected in series with a known impedance element across a source of voltage and that series connection is paralleled by another series connection of two known impedance elements. A voltage or current detector is bridged between the junction of the first two serially connected elements and the junction of the second two serially connected elements. One or more of the known elements is adjustable and the bridge is balanced by adjusting the known element or elements until the detector indicates no voltage difference or current flow between the two junctions. Under these conditions, there is a proportionality between the known and the unknown elements from which the unknown element can be determined in terms of the known elements.

In the case of low loss reactive devices, such for example as capacitors, there are separate and distinct resistive and reactive quantities to be measured and the term direct reading bridge as used herein means a bridge having separate adjustable calibrated dials or sliders whose separate settings or reading when the bridge is balanced give direct readings of those quantities.

An example of such a bridge, on which the present invention is an improvement, is described in my A.I.E.E. paper 50–110 published in vol. 69 of the A.I.E.E. Transactions, p. 692, entitled, "A Direct Reading High Voltage Capacitance Bridge."

In practice, direct reading capacitance bridges measure a specimen capacitor's capacitance and dissipation factor. The latter is a very useful indication of the loss quality or resistive quantity of a capacitor's dielectric material. Numerically, it is proportional to the product of the capacitance and effective series resistance of the capacitor. It is also the tangent of what is called the defect angle of the capacitor. The latter is ordinarily a very small angle compared with the phase angle between the voltage and current of a capacitor. Actually the defect angle is the complement of the phase angle between the voltage and the current.

However, such bridges are subject to a number of errors and weaknesses which become increasingly serious as the degree of precision such bridges are called upon to produce, and the magnitude of the voltage at which they operate, increases.

In accordance with one feature of the invention, the accuracy of a direct reading alternating current capacitance bridge is increased by compensating for the error producing effect of the unavoidable impedance of the lead or leads by which the test specimen is connected to the bridge. One such lead is called the bridge yoke and this invention provides novel yoke compensating means for alternating current bridges.

Another feature of the invention is the provision of novel protective means for protecting the bridge from the effect of an electrical failure or breakdown of the test capacitance.

An object of the invention is to provide a new and improved direct reading alternating current capacitance bridge.

Another object of the invention is to provide improved protective means for a high voltage direct reading alternating current capacitance bridge.

An additional object of the invention is to provide a yoke compensating alternating current electrical bridge.

A further object of the invention is to provide a new and improved guard system and guard amplifier for an alternating current direct reading bridge.

The invention will be better understood from the following description taken in connection with the accompanying drawings and its scope will be pointed out in the appended claims.

Figure 2:
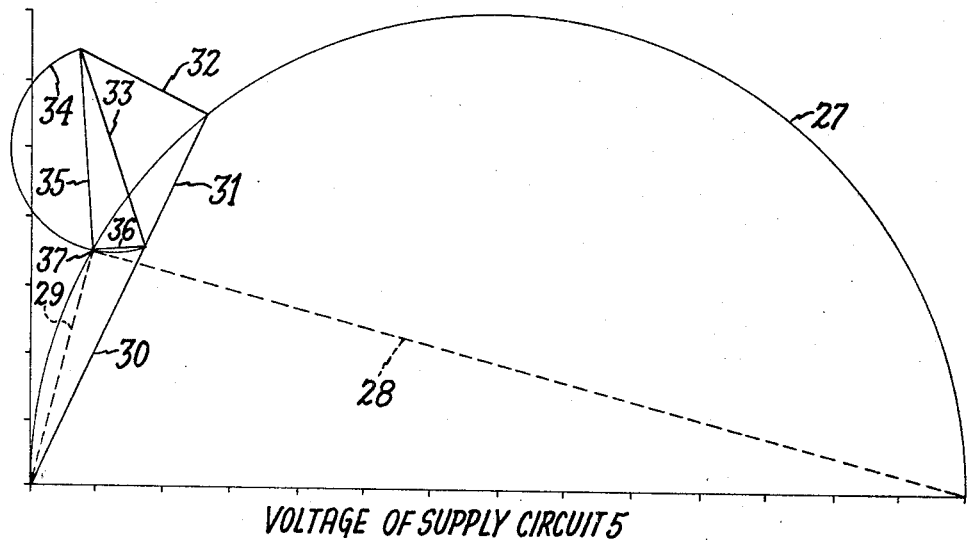
Figure 3:
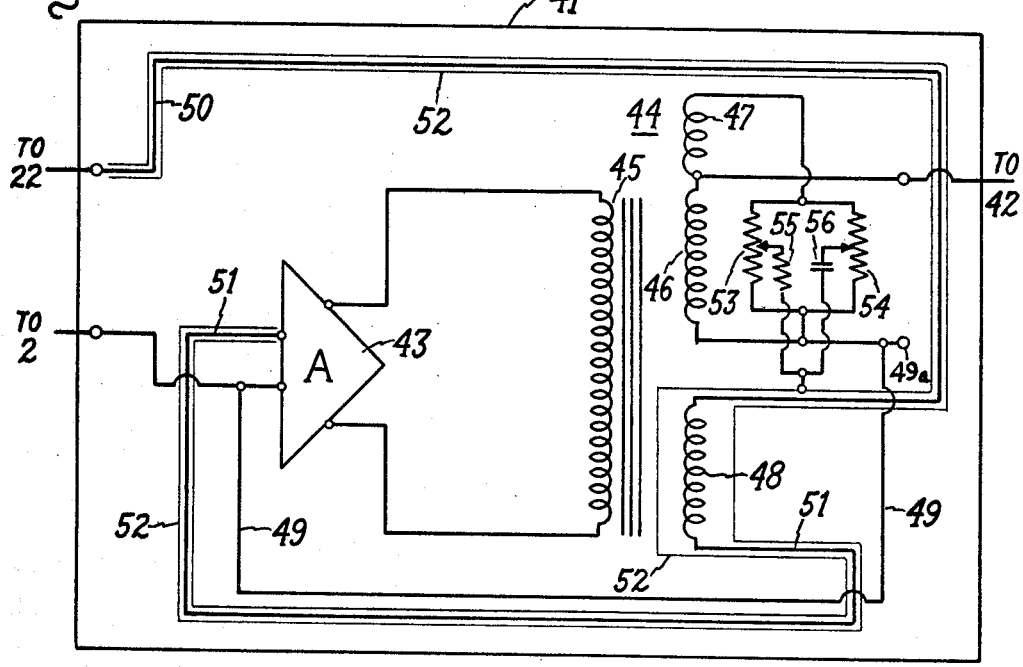
Figure 4:
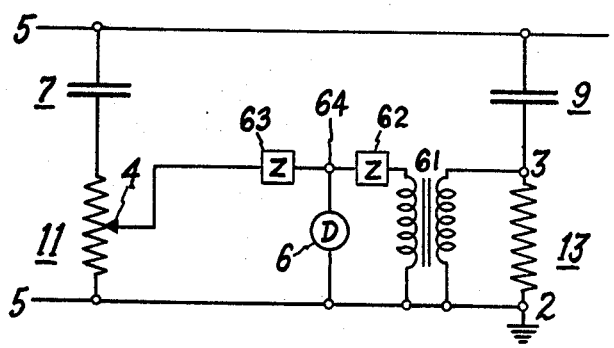
Figure 5:
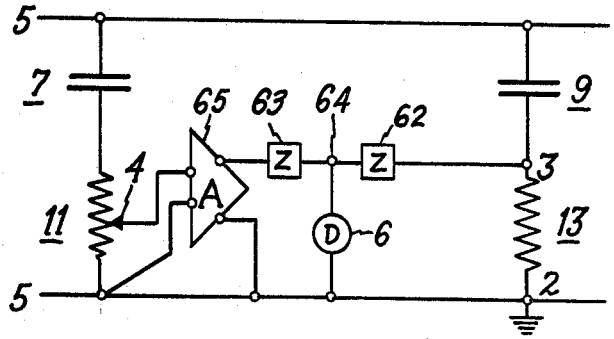

In the drawings,
FIG. 1 is a circuit diagram of an improved direct reading capacitance bridge,
FIG. 2 is a diagram for explaining the operation of the yoke compensation feature of FIG. 1,
FIG. 3 is a circuit diagram of the guard amplifier included in FIG. 1,
FIGS. 4 and 5 are modifications in which the polarity of the voltage of one of the arms of the bridge is reversed for effectively reducing the number of terminals of the bridge from 4 to 3.

Referring now to the drawings, and more particularly to FIG. 1, there is shown therein by way of example a so-called cross product bridge having four terminals identified as input terminals 1 and 2 and output terminals 3 and 4. The input terminals 1 and 2 are respectively connected to opposite sides of a high voltage alternating current power supply circuit 5, and a detector 6 of any suitable type is connected between the output terminals 3 and 4.

The detector 6 is a conventional element and may typically be a tuned amplifier having sufficient gain at fundamental frequency to permit detection of significant error signals and which is capable of rejecting harmonic voltages.

Connected between input terminal 1 and the output terminal 4 is a complex arm 7 of the bridge which contains a number of circuit elements the principal one of which is a standard capacitor 8 having known capacitance and no significant loss. Connected between input terminal 1 and output terminal 3 is another complex arm 9 of the bridge containing a number of circuit elements the principal one of which is a speciment or test capacitor 10 whose characteristics are to be measured but which ordinarily will not be loss free, and in fact one of its properties to be measured is its power losses reflected as dissipation factor. Connected between the input terminal 2 and output terminal 4 is another complex arm 11 of the bridge whose principal element is an adjustable resistance 12. Connected between the input terminal 2 and the output terminal 3 is a fourth complex arm 13 of the bridge whose principal element is a resistor 14 commonly termed the shunt or standard resistor and which in practice will be any one of a set of a set of resistors varying in decade or 10 to 1 steps.

The output terminal 4 is a sliding contact on the resistor 12 whose position is adjustable to obtain the so-called capacitance balance of the bridge.

As is well known in the art, the impedance $Z_{11}$ of the arm 11 of the bridge is adjusted until there is a null reading of the detector 6 at which point the characteristics of the specimen capacitor 10 can be determined from the well-known formula for a cross product bridge which can be stated as $$Z_9 = Z_7 \times \frac{Z_{13}}{Z_{11}} \quad (1)$$

Thus the unknown can be determined in terms of known quantities.

The complex arms 7 and 11 are not novel per se and correspond generally to the upper and lower left-hand arms of the bridge shown in FIG. 4A of the previously referred to A.I.E.E. article. Briefly, the standard capacitor 8 of the arm 7 is considered to have insignificant losses. It comprises a high voltage electrode 15 opposite a smaller low voltage electrode 16 and auxiliary guarding or shielding electrodes 17 associated with the low voltage electrode 16. The principal dielectric of the standard capacitor is a vacuum or a gas such as air, sulfahexafluoride or other electronegative gas. Because it is impossible to support and maintain the spacing between the main and auxiliary electrodes without the use of solid dielectric material which has much higher losses per unit volume than a vacuum or gas, the auxiliary electrodes 17 in effect isolate or shield the low voltage electrode 16 from such solid insulation so that the capacitor has a main or standard low loss capacitance $C_S$ between the high and low voltage electrodes 16 and 17 and auxiliary higher specific loss capacitance $C_G$ between the high voltage electrode and each shielding electrode 17. $C_S$ is to all intents and purposes a pure capacitance. In order to accomplish this, it is, of course, necessary that the potential of the low voltage electrode 16 and the guard electrode 17 be close to each other and this is achieved by other circuit elements to be described hereafter.

With the circuit as thus far described $C_X$ the unknown capacitance of the specimen capacitor 10 is, except for insignificant higher order effects, equal to $$\frac{C_s \times R_{12}}{R_{14}} \quad (2)$$

when the slider corresponding to the output terminal 4 is set or adjusted to a position for minimum reading of the detector 6 which is another way of saying for the condition when the bridge is balanced for capacitance. This does not, however, mean that the reading of the detector 6 is a complete zero or null reading under such conditions. $R_{12}$ and $R_{14}$ are, of course, the resistance of adjustable resistor 12 and fixed shunt resistor 14, respectively.

In the arm 11, the magnitude of the variable resistance 12 is determined by the position of the slider contact at the output terminal 4 of the bridge. Actually there is a remaining resistance or resistor 12' over which the sliding contact moves, the relationship between 12 and 12' being such that their sum is constant. In other words, they constitute a fixed value resistor. This means that the pure capacitance $C_S$ of the arm 7 of the bridge is somewhat degraded by the value of the resistance 12' which, of course, varies inversely with the value of the resistance 12 of the arm 11. In order to eliminate this degrading effect, as fully explained in my previously referred to A.I.E.E. paper, a capacitor 18 having a capacitance equal to $C_S$ of the standard capacitor is connected between the output terminal 4 and input terminal 2. A resistor 19 is connected between guards 17 and input terminal 2, and a capacitor 20 is connected between electrodes 16 and 17 of the standard capacitor, i.e. in shunt with the dielectric between $C_S$ and $C_G$.

The dissipation factor of test capacitor 10 is determined by the capacitance of an adjustable capacitor 21 connected across the fixed resistor comprising inversely variable resistors 12 and 12' in series in arm 11. Capacitors 21 can be adjusted to reduce to zero the minimum reading of the detector 6 previously obtained by the adjustment of the output terminal slider 4. With such a null reading of the detector, Equation 1 above will be satisfied and capacitor 21 can be calibrated to read directly the dissipation factor of specimen capacitor 10. Under this balanced condition of the bridge it has a certain symmetry in that the relation of the effective pure capacitance $C_S$ in arm 7 to the substantially pure resistance 14 in arm 13 is the same as the relation between the "leaky" capacitor 10 in the arm 9 and the combination of resistance 12 and capacitance 21 in arm 11.

In the case of an ordinary alternating current direct reading capacitance bridge output terminal 3 would be connected to point 22 corresponding to the end of the resistance 14. In a practical bridge a finite length of lead 23 must be connected between point 22 and point 24 on the unknown capacitor 10. Because of the unavoidable impedance $Z_Y$ of this length of yoke lead 23 an error is introduced in the determination of the dissipation factor of the unknown capacitor 10. In order to overcome this error, a network is shown as consisting of a capacitor 25 and a resistance 26 connected in series between points 22 and 24. Output terminal 3 now connects to the junction of capacitor 25 and resistance 26. By properly proportioning the capacitance of capacitor 25 and the resistance of resistor 26, the effect of the impedance $Z_Y$ of the yoke lead 23 can be minimized. This can best be explained by reference to FIG. 2.

FIG. 2 is a circle diagram showing the voltage relationships involved in arms 9 and 13 of the bridge including, of course, the yoke compensating circuit which is a part of both arms. In this diagram, the base line is a vector representing the voltage of the alternating current supply circuit 5; that is to say it is the voltage impressed between the input terminals 1 and 2. As is well known the voltage of the locus of the junction of a pure resistance and a pure reactance element connected in series across a supply voltage will be the arc of a circle whose diameter is proportional to the magnitude of the supply voltage. In FIG. 2 that semicircle is shown as 27. If there were no impedance between points 22 and 24, i.e. if there were no yoke lead, vector 28 would be the voltage across the specimen capacitor 10 and vector 29 would be the voltage across the resistor 14, the junction of these two vectors falling on the circle 27. This assumes that capacitor 10 and resistor 14 are pure reactive and resistive elements which within the degree of accuracy required for yoke compensation is a justifiable assumption. The effect of yoke impedance $Z_Y$ on the diagram as thus far described is shown by the vectors 30, 31, 32 and 33. Vector 30 is the drop across resistor 14 which has been modified by the introduction of the yoke impedance. Vector 31 in phase with vector 30 is the drop across the resistive portion of yoke impedance $Z_Y$. Vector 32 is the drop across the inductive portion of the yoke impedance $Z_Y$ and vector 33 is the resultant of the latter two, i.e. the drop across the impedance $Z_Y$. It is that voltage of vector 33 which is impressed across the yoke compensating circuit comprising capacitor 25 and resistor 26 in series. The vector voltages across these two elements also form another circle diagram 34 whose base is the vector 33. In this auxiliary circle diagram the vector 35 is the voltage across the capacitor 25 and the vector 36 is the voltage across the resistor 26, and it will be noted that these are of such relative magnitude as to bring the voltage of their junction back on the main circle diagram 27 at the same point corresponding to the junction of the vectors 28 and 29. This point is indicated at 37 on both diagrams. The voltage at point 37 corresponds to the voltage of output terminal 3 and it will thus be seen that it is the same as though point 3 were connected solidly to a junction of points 22 and 24 between which there was no yoke impedance.

As confirmed by inspection of FIG. 2, it can also be shown that for the junction of the vectors 28 and 29 to coincide with the junction of the vectors 35 and 36, the triangles formed by these two sets of vectors and their respective bases of their respective circle diagrams are similar triangles. In other words, in order to obtain yoke compensation the product of the capacitance $C_X$ of the specimen capacitor 10 and the resistance of the resistor 14 is equal to the product of the capacitance of capacitor 25 and the resistance of resistor 26 in the yoke compensating circuit.

In order to maintain this cross product relationship with different test capacitors having different values of capacitance $C_X$, I make the resistor 26 adjustable and mechanically drive it by any suitable linkage 38 from the output terminal slider contact 4 whose position is a direct measure of the capacitance $C_X$ of any test capacitor in the circuit when the bridge is balanced. In other words as $C_X$ varies with different test capacitors, I automatically vary the resistance of resistor 26 to maintain the previously stated cross product relationship for obtaining yoke compensation.

Returning now to FIG. 1, the bridge is shown as provided with a so-called automatic guard circuit for preventing leakage currents from impairing the accuracy of the bridge. This guard circuit consists essentially of a system of conductive shields 39 surrounding the parts of the bridge to be shielded. This shielding system is maintained automatically at the potential of the point 22 by means of a guard amplifier 41 whose input is connected across the shunt resistor 14, i.e. between the points 2 and 22 and whose output is connected between point 2 and the shield system via conductor 42. This amplifier has a very high input impedance and a one to one gain and zero phase shift so that normally there is no voltage difference between point 22 and the shield system 39. There, therefore, can be no leakage current or drain from the shielded parts of the bridge circuit directly connected to point 22 and ordinarily having the potential of point 22, all the actual leakage currents being supplied by the output of the amplifier. In other words, the path of all the leakage currents is through the output of the amplifier and not through the resistor 14 so that these leakage currents can not have the accuracy impairing effect that they otherwise would have if they flowed through the resistor 14.

Amplifier 41 is a power amplifier and as previously stated it has a very high input impedance, a one to one voltage gain and a zero phase shift between its input and its output. The latter two characteristics of the amplifier are obtained by conventional and well-known means. Typically the one to one gain is obtained by one or a series of feedback loops. However, the very high input impedance is obtained by a novel circuit arrangement of the amplifier as shown in FIG. 3.

Referring now to FIG. 3, the amplifier is shown as consisting essentially of an amplifier section 43 and an output transformer 44. The output of the amplifier section 43 is connected to feed directly into the primary winding 45 of the output transformer 44. The output transformer 44 has a main output sceondary winding 46, an auxiliary output secondary winding 47 in series therewith, and a feedback secondary winding 48 which is part of the final feedback loop for obtaining a one to one gain. As shown, one terminal of the output winding 46 is connected directly to the output terminal of the amplifier to which the output lead 42 is connected. The other end of the main output winding 46 is conneced directly by a conductor 49 to the input terminal 49a of the amplifier which, as shown in FIG. 1, is connected to the input terminal 2 of the bridge. As shown in FIG. 3 this is also connected directly to one of the input terminals of the amplifier section 43. The feedback winding 48 is connected in series with the input to the amplifier by a conductor 50 extending from the input terminal of the amplifier 41 which is shown connected to point 22 of the bridge in FIG. 1 and by a conductor 51 which connects the other end of the feedback winding to the remaining input terminal of the amplifier section 43. The feedback winding 48 and its leads 50 and 51 whereby it is connected in series with the input to the amplifier are all completely enclosed by a continuous conductive electorstatic shield 52.

By maintaining the magnitude and phase of the potential on the shield 52 at appropriate values all of the stray admittances associated with the input of the amplifier are effectively reduced to zero. This, of course, does not mean that such appropriate shield potential is constant. On the contrary, it varies in proportion to the input signal level so that here is a constant ratio therebetween.

Such appropriate potential may be derived in any suitable way such as by a pair of potentiometers 53 and 54 connected in parallel across the main output winding and auxiliary winding in series, the latter being provided merely for the purpose of obtaining a high enough voltage. The slider contacts of potentiometers 53 and 54 are connected respectively through a resistor 55 and a capacitor 56 to the shield 52. With such a circuit arrangement, when the potentiometers 53 and 54 are adjusted for the appropriate shield potential at any given input signal level that potential will automatically rise and fall with changes in signal level so as to maintain the potential necessary for maintaining the high input impedance. It should be noted that this appropriate potential takes account not only of the leakage currents of winding 48 and its leads but also of the input of the amplifier section 43.

Returning now to FIG. 1 another feature of the invention is the provision of novel means for protecting so-called shunt resistor 14 in the arm 13, and insulation of the associated parts of the bridge circuit connected thereto, from damage as a result of breakdown of the specimen or high transient voltages from external sources. At first thought it would seem that the connection of any conventional overvoltage protective device across the resistor 14 would satisfactorily protect the resistor 14 and that would be true during abnormal conditions. However, such a device also has leakage currents which shunt around the resistor 14 and impair the accuracy of the bridge. During normal conditions the effect of these leakage currents could be nullified by having the electrode of the protective device connected to the point 2 through the amplifier output instead of directly to the point 2. In other words, during normal conditions the guard amplifier 41 could maintain zero potential difference across the protective device. The defeat of such an arrangement is that upon the occurrence of abnormal conditions the amplifier does not have sufficiently low impedance safely to carry these excessive currents to terminal 2. In other words, a simple protective device will introduce errors during normal conditions and guarding of the protective device to eliminate such errors will prevent it from functioning to give adequate protection under abnormal conditions.

In accordance with another feature of this invention, there is provided a novel protective network which overcomes these difficulties and prevents the occurrence of errors during normal conditions while providing complete protection during abnormal conditions. As shown this comprises a pair of low pressure gaseous discharge gaps such as neon tubes 57 and 58 serially connected between points 2 and 22 with their junction connected to the guard system 39 and/or the output lead 42 of the amplifier 41.

The operation of gap devices 57 and 58 in relation to the guard system is as follows. Under normal conditions the guard amplifier 41 maintains the two electrodes of the gap device 58 at the same potential so that there is no voltage difference between its electrodes. Consequently, it can have no leakage currents which will adversely affect the accuracy of the bridge circuit by virtue of its shunting effect across the resistor 14. At the same time any leakage current associated with the gap device 57 will be supplied by the guard amplifier 41 so that under normal conditions the bridge elements are effectively isolated from the gaps 57 and 58. If, however, an abnormally high surge of current tends to flow through the resistor 14 the voltage drop across it will, of course, increase in direct proportion to the current or in short become excessive, i.e. excessive current through the resistor 14 will be accompanied by excessive voltage across its terminals. This excess voltage across the resistor 14 will distribute itself across the gap devices 57 and 58 in various ways depending upon its time rate of increase. However, regardless of how it distributes itself one of the gap devices will break down before the other one does and as soon as one breaks down the voltage across the other one will increase still further because the arc drop of the device which has broken down is necessarily less than its breakdown voltage, so the breakdown of the first device will almost instantaneously be followed by the breakdown of the second one, and then there will be a voltage limiting arc drop of the two devices in series which protects the bridge from over-voltages, and incidentally also the guard amplifier by virtue of gap 57 being across the guard amplifier output.

The gaseous devices 57 and 58 while having desirably low breakdown and arc drop voltages are, however, slow to break down or fire. By slow is meant a time interval of the order of five microseconds during which time permanent damage can be done to the insulation of the bridge. Therefore, in order to give faster protection, air gap devices 59 and 60 are connected respectively in parallel with the gaseous devices 57 and 58.

The characteristic of such air gap devices is that they have comparatively very fast response being of the order of one-half a microsecond, but they do have a higher breakdown potential than the low pressure gaseous devices, being of the order of 600 volts in comparison with a typical breakdown voltage of 90 volts for the gaseous devices. Therefore, the function of the air gap devices is to provide fast temporary comparatively high voltage level protection which is then followed up by the more or less continuous duty protection provided by the gaseous devices as soon as they break down in a matter of five microseconds after the air gap devices break down.

During normal conditions the two-stage guarding action for the gaseous devices 57 and 58, of course, also exists for the air gap devices 59 and 60 so that their performance in nowise disturbs the accuracy of the bridge during normal operation.

The bridge shown in FIG. 1 is a manually balanced bridge. Sometimes it is desirable to have a self-balancing bridge and this can easily be done by driving the slider terminal 4 and the adjustable capacitor 21 by any suitable servo system responsive to the detector 6. However, when this is done it becomes necessary to derive the servo operating power from the supply line. When both terminals of the detector system operate at potentials above ground as shown in FIG. 1 there is great danger that spurious currents from the A-C power line may be transmitted through one or more arms of the bridge to ground thereby giving rise to serious errors in indications of the bridge. Therefore, in self-balancing bridges, it is highly desirable that one side of the detector be at ground potential. This necessitates converting the four-terminal bridge, as shown in FIG. 1, to a three-terminal bridge in which the input and output terminals necessarily have a common terminal which commonly can be the ground terminal. One way to make this conversion from a four-terminal bridge to a three-terminal bridge is to reverse the polarity of the potential of one arm of the bridge. Two ways of doing this are shown respectively in FIGS. 4 and 5. In FIG. 4 an insulating transformer 61 has its primary winding connected across arm 13 of the bridge and its secondary winding connected through summing impedances 62 and 63 across the arm 11 of the bridge. The detector in this case is connected between terminal 2 which is common to the input and output of the bridge and a new summing junction point 64 corresponding to the third terminal of a three-terminal bridge. The secondary winding is so connected as effectively to reverse the polarity of the voltage of the arm 13 so that two currents flow through the detector, one coming from arm 11 and flowing through summing impedance 63, and the other coming from the secondary winding of the transformer 61 and flowing through the summing impedance 62. Due to the effective reversal of polarity of the arm 13, these currents are in opposite directions in the detector and cancel each other when the bridge is balanced. This results in zero voltage across the detector exactly as in the circuit of FIG. 1.

In the modification shown in FIG. 5, the polarity of the voltage of the arm 11 is reversed by means of a phase reversing amplifier 65. The circuit is otherwise the same as FIG. 4 and in balanced condition the currents flowing through the detector will balance out to zero when the bridge is balanced as in FIG. 4.

The circuits of FIGS. 4 and 5 give considerable design freedom because the transformer 61 and/or the phase reversing amplifier 65 can have any desired input to output voltage ratio and whatever differences there are in the voltages or currents which are summed in the detector can be reconciled by suitably adjusting the relative impedance of the summing impedances 61 and 62 or the relative impedances of the arms 11 and 13 of the bridge itself.

While the invention has been shown and described in connection with a direct reading bridge, it should be understood that the various novel features of the invention are also useful in other kinds of bridges.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. In an alternating current capacitance bridge, a yoke lead for interconnecting two arms of the bridge one of which contains a specimen capacitor to be measured and the other of which contains a standard resistor, and means for compensating for the impedance of said yoke lead so as to provide an output terminal of said bridge whose voltage corresponds to that of an impedanceless junction of said specimen capacitor and resistor comprising an auxiliary capacitor and an auxiliary resistor serially connected with each other in shunt with said yoke lead, said auxiliary capacitor being connected to said specimen capacitor, and said auxiliary resistor being connected to said standard resistor, said output terminal being the junction of said auxiliary capacitor and auxiliary resistor, the product of the capacitance of said auxiliary capacitor and the resistance of said auxiliary resistor being the same as the product of the capacitance of said specimen capacitor to the resistance of said standard resistor.

2. T bridge as defined in claim 1 having adjusting means for balancing said bridge, said adjusting means having a scale for giving direct reading of the capacitance of said specimen capacitor when the bridge is balanced, said auxiliary resistor being vairable, and a connection for driving said variable resistor from said adjusting means so as to maintain equality of said capacitance times resistance products for specimen capacitors having different capacitances when said bridge is balanced.

3. In an alternating current capacitance bridge comprising a plurality of impedance arms and electric connections therebetween, electrostatic shielding means enclosing at least a portion of said electric connections, a low gain power amplifier having an input circuit including a feedback winding and connected across one arm of said bridge and an output circuit connected between said shielding means and a terminal of said bridge, said feedback winding being energized in proportion to the amplifier's output voltage and connected in series circuit relation with said input circuit, second electrostatic shielding means for said feedback winding and its connections to the amplifier input, and an adjustable voltage phase shifting network energized by the output of said amplifier for applying to said second electrostatic shielding means an electric potential so proportioned to the output voltage of said amplifier and of such magnitude and phase relative thereto that the effective input impedance of said amplifier is substantially infinite.

4. A bridge as defined in claim 3 in which said phase shifting network comprises a pair of potentiometers connected in shunt circuit relation with each other across the output circuit of said amplifier, and a resistor and a capacitor for respectively connecting the adjustable outputs of said potentiometers to said second electrostatic shielding means.

5. In an alternating current capacitance bridge, a pair of input terminals, a bridge arm comprising a resistor for connection in series with a specimen capacitor between said input terminals, electrostatic shielding means enclosing at least a portion of said bridge, means maintaining said shielding means at the potential of one end of said resistor, and overvoltage protective means for said bridge comprising a pair of gap devices serially connected with each other across said resistor with the junction between said gap devices connected to said shielding means.

6. In an alternating current capacitance bridge, a pair of input terminals, a bridge arm comprising a resistor for connection in series with a specimen capacitor between said input terminals, electrostatic shielding means enclosing at least a portion of said bridge, a low gain power amplifier having an input circuit connected across said resistor and an output circuit connected between said shielding means and a terminal point of said bridge, and overvoltage protective means for said bridge comprising a pair of gap devices serially connected with each other across said resistor with the junction between said gap devices connected to said shielding means.

7. A bridge as defined in claim 5 in which said gap devices each are enclosed in a sealed envelope containing a gas at substantially less than atmospheric pressure.

8. A bridge as in claim 7 in which said gas is an electronegative gas.

9. A bridge as in claim 5 in which said gap devices operate in air at atmospheric pressure.

10. In an alternating current capacitance bridge, a pair of input terminals, a bridge arm comprising a resistor for connection in series with a specimen capacitor between said input terminals, electrostatic shielding means enclosing at least portions of said bridge, overvoltage protective means for said bridge comprising a series-parallel network of four gap devices connected across said resistor with the junctions between each serially connected pair of devices connected to said shielding means, one serially connected pair of devices each being in a sealed envelope containing a gas of substantially less than atmospheric pressure, the other serially connected pair of devices each operating in air at atmospheric pressure.

11. In an alternating current capacitance bridge, a pair of input terminals, a bridge arm comprising a resistor for connection in series with a specimen capacitor between said input terminals, electrostatic shielding means enclosing at least portions of said bridge, a power amplifier energized by the voltage across said resistor and having an output circuit connected to maintain said shielding means at the potential of a selected terminal point of said bridge, and overvoltage protective means for said bridge comprising a series-parallel protective of four gap devices connected across said resistor with the junctions between each serially connected pair of devices connected to the output of said power amplifier, one serially connected pair of devices each being in a sealed envelope containing a gas of substantially less than atmospheric pressure, the other serially connected pair of devices each operating in air at atmospheric pressure.

12. In a capacitance bridge having a plurality of impedance arms, conductors connecting said arms in bridging relation, conductive electrostatic shielding means enclosing at least some of said conductors, overvoltage protective means for said bridge comprising a plurality of gap devices connected in series circuit relation across one of said arms, and means connecting an internal point of said serially connected gap devices to said shielding means.

13. A bridge as in claim 12 in which each of said gap devices is connected in parallel with another gap device having a higher voltage but more rapid breakdown characteristic.

14. In an alternating current capacitance bridge, a pair of input terminals, a bridge arm comprising a resistor for connection in series with a specimen capacitor between said input terminals, electrostatic shielding means enclosing at least portions off said bridge, and overvoltage protective means for said bridge comprising a pair of gap devices connected in parallel circuit relation across said resistor, one of said gap devices breaking down at a higher voltage but slower than the other one, said gap devices being connected to said shielding means.

References Cited

UNITED STATES PATENTS

| 1,971,711 | 8/1934 | Gaudenzi et al. | 317—62 XR |
| 1,984,333 | 12/1934 | Carter | 317—62 |
| 2,719,262 | 9/1955 | Bousman | 324—67 |
| 2,789,254 | 4/1957 | Bodle et al. | 317—33 XR |
| 2,923,879 | 2/1960 | Povey | 324—54 |
| 3,139,579 | 6/1964 | Gravel | 324—57 |
| 3,142,015 | 7/1964 | Kusters et al. | 324—60 |
| 3,198,986 | 8/1965 | Luehring et al. | 317—62 XR |

FOREIGN PATENTS

| 1,171,667 | 1/1959 | France. |
| 491,109 | 2/1930 | Germany. |
| 757,167 | 11/1953 | Germany. |
| 554,896 | 7/1943 | Great Britain. |
| 659,880 | 10/1951 | Great Britain. |
| 821,227 | 10/1959 | Great Britain. |

OTHER REFERENCES

Bruckel, German printed application, No. T468 VIII c./21e, pub. 1–1956.

RUDOLPH V. ROLINEC, *Primary Examiner.*

E. E. KUBASIEWICZ, *Assistant Examiner.*